US005674943A

United States Patent [19]

Farah et al.

[11] Patent Number: 5,674,943
[45] Date of Patent: Oct. 7, 1997

[54] POLYCARBONATE COMPOSITIONS MODIFIED WITH A POLYAMINE COMPOUND

[75] Inventors: Hani Farah, Sugarland; Leo Novak, Lake Jackson; Michael K. Laughner, Lake Jackson; Ralph D. Priester, Jr., Lake Jackson, all of Tex.

[73] Assignee: The Dow Chemical Company, Midland, Mich.

[21] Appl. No.: 389,816

[22] Filed: Feb. 14, 1995

[51] Int. Cl.$^6$ ...................................................... C08F 8/00
[52] U.S. Cl. ........................ 525/146; 525/167; 525/176; 525/438; 525/439
[58] Field of Search ............................. 525/146, 167, 525/176, 438, 439

[56] References Cited

U.S. PATENT DOCUMENTS

| | | | |
|---|---|---|---|
| 3,584,047 | 6/1971 | Dexter et al. | 260/559 |
| 3,956,569 | 5/1976 | Jyo et al. | 428/412 |
| 4,124,549 | 11/1978 | Hashiudo et al. | 260/18 N |
| 4,144,284 | 3/1979 | Semanaz et al. | 260/857 PA |
| 4,172,858 | 10/1979 | Clubley et al. | 525/2 |
| 4,172,859 | 10/1979 | Epstein | 428/402 |
| 4,218,543 | 8/1980 | Weber et al. | 521/51 |
| 4,228,218 | 10/1980 | Takayanagi et al. | 525/58 |
| 4,263,409 | 4/1981 | Liberti | 521/81 |
| 4,280,005 | 7/1981 | Fox | 521/90 |
| 4,608,404 | 8/1986 | Gardner et al. | 523/400 |
| 4,632,962 | 12/1986 | Gallucci | 525/282 |
| 4,639,486 | 1/1987 | Liu | 524/409 |
| 4,663,373 | 5/1987 | Ravichandran et al. | 524/101 |
| 4,704,331 | 11/1987 | Robins et al. | 428/414 |
| 4,737,523 | 4/1988 | White et al. | 521/91 |
| 4,752,415 | 6/1988 | Iwaskow et al. | 252/511 |
| 4,772,496 | 9/1988 | Maeda et al. | 252/511 |
| 4,787,991 | 11/1988 | Morozumi et al. | 428/35 |
| 4,788,249 | 11/1988 | Maresca et al. | 525/66 |
| 4,788,283 | 11/1988 | Karrer | 544/82 |
| 4,814,380 | 3/1989 | Liu | 525/66 |
| 4,826,894 | 5/1989 | Markusch et al. | 523/415 |
| 4,841,001 | 6/1989 | Hawkins | 525/468 |
| 4,845,133 | 7/1989 | Priester, Jr. et al. | 521/167 |
| 4,847,416 | 7/1989 | Durvasula et al. | 564/443 |
| 4,855,181 | 8/1989 | Shimo et al. | 428/336 |
| 4,857,593 | 8/1989 | Leung et al. | 525/92 |
| 4,886,842 | 12/1989 | Drain et al. | 522/103 |
| 4,923,718 | 5/1990 | Iida et al. | 427/386 |
| 4,945,003 | 7/1990 | Poole et al. | 428/462 |
| 4,954,574 | 9/1990 | Hallden-Abberton et al. | 525/327.6 |
| 4,959,481 | 9/1990 | Axelrod et al. | 548/462 |
| 4,994,503 | 2/1991 | Harris et al. | 521/137 |
| 5,047,487 | 9/1991 | Camargo et al. | 525/432 |
| 5,081,184 | 1/1992 | Brown et al. | 525/67 |
| 5,095,054 | 3/1992 | Lay et al. | 524/47 |
| 5,096,974 | 3/1992 | MacLeay et al. | 525/67 |
| 5,106,884 | 4/1992 | Turner et al. | 521/123 |
| 5,132,371 | 7/1992 | Sasaki et al. | 525/301 |
| 5,162,405 | 11/1992 | MacLeay et al. | 524/91 |
| 5,202,385 | 4/1993 | Bailly et al. | 525/425 |
| 5,219,493 | 6/1993 | Seshadri | 252/500 |
| 5,369,154 | 11/1994 | Laughner | 523/436 |

OTHER PUBLICATIONS

Derwent Abstract 91-186933/26, (EP 434080-A), (91-06-26).
Derwent Abstract 91-105918/15, (JP 03047851-A), (91-02-28).
Derwent Abstract 90-280342/37, (JP 02199128-A), (90-08-07).
Derwent Abstract 83-802063/44, (DE 3214982-A), (83-10-27).
Chemical Abstract 113(12):98797q, (1990).

Primary Examiner—Terressa Mosley

[57] ABSTRACT

A blended composition containing polycarbonate, polyester, an olefinic epoxide-containing copolymer and a polyamine compound, which composition possesses a desirable balance of impact resistance, solvent resistance, and resistance to thermal deformation.

14 Claims, No Drawings

POLYCARBONATE COMPOSITIONS MODIFIED WITH A POLYAMINE COMPOUND

FIELD OF THE INVENTION

This invention relates to carbonate polymers, particularly those which have good resistance to thermal deformation, and to compositions formed therefrom.

BACKGROUND OF THE INVENTION

Polycarbonate has found many uses because, in general, it combines a superior level of heat resistance and dimensional stability with good insulating and non-corrosive properties, and it is easily molded. However, its ductility can be reduced when it is blended with other polymers such as polyester.

Reduced ductility can be a problem particularly where the blended polycarbonate is one which, by reason of the presence of numerous ring structures or bulky substituents, is subject to failure by brittle fracture even when used alone as a molding material. Polycarbonates characterized by such ring structures and bulky substituents do have a notably high resistance to thermal deformation, but they typically exhibit a lack of toughness, manifested particularly as notch sensitivity, at a sufficiently high level to outweigh the benefits which would otherwise be obtainable from such excellent resistance to thermal deformation.

It would accordingly be desirable if ductility could be predictably and reliably obtained in polycarbonate/polyester blends, and particularly in those blends containing polycarbonate which is characterized by a high level of resistance to thermal deformation but by low, or a lack of, ductility.

SUMMARY OF THE INVENTION

In one aspect this invention involves a composition of matter containing, in admixture, (a) polycarbonate, (b) polyester, (c) an olefinic epoxide-containing copolymer, and (d) a polyamine compound. In an optional embodiment, this invention involves a composition as described above which also contains an elastomeric impact modifier.

The compositions of this invention are useful, for example, in the production of films, fibers, extruded sheets, multi-layer laminates and molded or shaped articles of virtually all varieties, especially appliance and instrument housings, motor vehicle body panels and other parts and components for use in the automotive, electrical and electronics industries. For example, it is contemplated that a motor vehicle may include one or more parts molded from a composition of this invention. The methods of this invention are useful for preparing compositions and molded articles having applications which are the same as or similar to the foregoing.

DETAILED DESCRIPTION OF THE INVENTION

The compositions of this invention are those in which a blend of (a) polycarbonate with (b) polyester has been admixed in a composition with (c) an olefinic epoxide-containing copolymer, and (d) a polyamine compound. The compositions of this invention may, optionally, contain (e) an elastomeric impact modifier.

Suitable ranges of content for components (a)–(d) in the compositions of this invention, expressed in parts by weight of the total composition, are as follows:

(a) polycarbonate from about 5 parts to about 92 parts, preferably from about 30 parts to about 90 parts, and more preferably from about 50 parts to about 87 parts, (b) polyester from about 5 parts to about 80 parts, preferably from about 10 parts to about 50 parts, and more preferably from about 10 parts to about 40 parts, (c) olefinic epoxide-containing copolymer from about 3 parts to about 30 parts, preferably from about 8 parts to about 20 parts, and more preferably from about 10 parts to about 15 parts, and (d) polyamine compound from about 0.0005 part to about 1.0 part, preferably from about 0.01 part to about 0.6 part, and more preferably from about 0.01 part to about 0.3 part.

When the compositions of this invention contain optional component (e), an elastomeric impact modifier, suitable ranges of content for it, expressed in parts by weight of the total composition, are up to about 50 parts, preferably from about 1 to about 40 parts, and more preferably from about 3 to about 20 parts.

The sum of the weight parts of the various components from which any particular formulation of a composition of this invention is prepared may, but need not, be 100.

Preparation of the compositions of this invention can be accomplished by any suitable mixing means known in the art. Typically the polycarbonate and chlorinated polyethylene, and other components or additives which are optionally present in the compositions of this invention, are dry blended in a tumbler or shaker in powder or particulate form with sufficient agitation to obtain thorough distribution thereof. If desired, the dry-blended formulation can further be subjected to malaxation, or to shearing stresses at a temperature sufficient to cause heat plastification thereof, for example in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence.

When softened or melted by the application of heat, the compositions of this invention can undergo fabrication and can therein be formed or molded using conventional techniques such as compression, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic substances, on any machine suitable for such purpose.

Inasmuch as articles molded from compositions prepared within the ranges of content stated above exhibit a balance of desirable levels of impact and solvent resistance, and resistance to thermal deformation, a method of improving such properties of a polycarbonate/polyester blend is to admix with it an olefinic epoxide-containing copolymer and a polyamine compound, and, optionally, with an elastomeric impact modifier.

Component (a) in the compositions of this invention is a polycarbonate, which can be prepared from a dihydroxy compound such as a bisphenol, and a carbonate precursor such as a disubstituted carbonic acid derivative, a haloformate (such as a bishaloformate of a glycol or dihydroxy benzene) or a carbonate ester. These components are often reacted by means of the phase boundary process in which the dihydroxy compound is dissolved and deprotonated in an alkaline aqueous solution and the carbonate precursor is dissolved in an organic solvent.

A mixture of such components is agitated in a manner which is sufficient to disperse or suspend droplets of the solvent containing the carbonate precursor in the alkaline aqueous solution. Reaction yields the bis(carbonate precursor) ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus. These intermediate mono- and oligocarbonates dissolve in the organic solvent as they form, and they can then be condensed to a higher molecular weight polycarbonate by contact with a coupling catalyst of which the following are representative: a tertiary amine such as triethyl amine or dimethyl amino pyridine. Such a catalyst may be added to the reaction mixture before or after it is contacted with a carbonate precursor.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst. The reaction is typically run at 250° C.–300° C. under vacuum. Polycarbonate can also be prepared in a homogeneous solution using a material, such as pyridine, dimethyl aniline or CaOH, which acts as both acid acceptor and condensation catalyst. Yet another process for the preparation of polycarbonate is the polymerization of cyclic oligomers having a weight average molecular weight of approximately 1,300 at 200 C.–300° C., using a catalyst such as lithium stearate or tetramethylammonium tetraphenylborate.

Examples of some dihydroxy compounds suitable for the preparation of polycarbonate include variously bridged, substituted or unsubstituted aromatic dihydroxy compounds (or mixtures thereof) represented by the formula

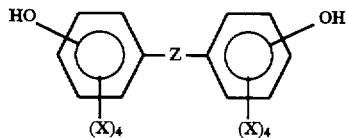

wherein:

(I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond; and (II) each X is independently hydrogen, a halogen atom (such as flourine, chlorine and/or bromine), a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy.

For example, the bridging radical represented by Z in the above formula can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$.

A polycarbonate with good thermal stability—a "high heat" polycarbonate—is defined as that which has a glass transition temperature ($T_g$) in excess of 155° C., advantageously in excess of 170° C., preferably in excess of 185° C., and most preferably in excess of 195° C. It typically contains on the backbone of the repeating unit numerous ring structures or bulky substituents, such as halogen, higher or branched alkyl, aryl, alkoxy or aryloxy substituents. $T_g$ is the temperature or temperature range at which an amorphous polymeric material shows an abrupt change in its physical properties, including, for example, mechanical strength. $T_g$ can be determined by differential scanning calorimetry.

Representative examples of high heat polycarbonates are those formed from dihydroxy compounds such as the following:

2,2-bis(3,5-dihalo-4-hydroxyphenyl)propane ("Tetrahalo Bisphenol-A") where the halogen can be fluorine, chlorine, bromine or iodine, for example 2,2-bis(3,5-dibromo-4-hydroxyphenyl)propane ("Tetrabromo Bisphenol-A" or "TBBA");

2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A");

1,1-bis(4-hydroxyphenyl)-1-phenyl ethane ("Bisphenol-AP" or "Bis-AP");

Bis(hydroxyphenyl) fluorene [Bishydroxy(α-diphenylenemethane)]; or from copolymers formed from any of the foregoing with 2,2-bis(4-hydroxyphenyl)propane ("Bisphenol-A" or "Bis-A"). In a preferred embodiment, the polycarbonate used in the compositions of this invention is a high heat polycarbonate, as described above, which would exclude a polycarbonate formed from Bisphenol-A alone as it has a $T_g$ of only about 149° C.

Using a process such as is generally described above, a polycarbonate product can be obtained having a weight average molecular weight, as determined by gel permeation chromatography, of 8,000 to 200,000 and preferably 15,000 to 40,000, although values outside these ranges are permitted as well. Molecular weight can be controlled by addition to the reaction mixture of a chain terminator which may be selected from monofunctional substances such as phenols, carbonic acid chlorides, or phenylchlorocarbonates. A chain terminator may be added to the reaction mixture before or after a dihydroxy compound is contacted with a carbonate precursor.

A branched rather than linear polycarbonate molecule can be obtained by adding to the reaction mixture a tri- or polyfunctional monomer such as a tri- or tetrafunctional phenol or carboxylic acid (or a derivative such as an acyl halide or anhydride), a bisphenol containing carboxylic acid side groups, or a nitrogen-containing compound such as cyanuric chloride, or compounds containing a mixture of such groups. Preferred branching agents are trisphenol ethane, trimellitic acid or pyromellitic dianhydride.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. When a dicarboxylic acid (or ester-forming derivative) or a hydroxycarboxylic acid is used in the reaction mixture, or to form an oligomeric prepolymer, instead of one of the different dihydroxy compounds mentioned above, a poly(ester/carbonate) is obtained. However, in a preferred embodiment, the polycarbonate used in this invention excludes a poly(ester/carbonate). Poly(ester/carbonate)s are discussed in greater detail in Swart, U.S. Pat. No. 4,105,533, which is incorporated herein.

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970, which is incorporated herein.

The methods generally described above for preparing carbonate polymers suitable for use in the practice of this invention are well known; for example, several methods are discussed in detail in Schnell, U.S. Pat. No. 3,028,365; Glass, U.S. Pat. No. 4,529,791; and Grigo, U.S. Pat. No. 4,677,162, each of which is incorporated as a part hereof.

Component (b) in the compositions of this invention is a polyester, which may be made by the self-esterification of hydroxycarboxylic acids, or direct esterification, which involves the reaction of a diol with a dicarboxylic acid with the resulting elimination of water, giving an -[-AABB-]-polyester. Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. Polyesters can also be produced by a ring-opening reaction of cyclic esters or lactones, for which organic tertiary bases and alkali and alkaline earth metals, hydrides and alkoxides can be used as initiators. Whether a polyester is crystalline or amorphous is typically a function of the symmetry of the starting materials from which it is made. A crystalline material may be identified by the endotherm it displays on a differential scanning calorimeter. A preferred polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as —O—, —S— or —SO$_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$–$C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl) sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG; liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each of which is incorporated herein by reference.

Component (c), the olefinic epoxide-containing copolymer used in this invention, is a copolymer which has a glass transition temperature ($T_g$) less than 0° C. and preferably less than –20° C.

The epoxide-containing copolymer used in this invention is formed from (i) at least one olefin monomer such as ethylene, propylene, isopropylene, butylene or isobutylene, or at least one conjugated diene such as butadiene, and the like, or mixtures thereof; and (ii) at least one ethylenically unsaturated (e.g. vinyl or vinylidene) monomer carrying at least one epoxide ring. In addition to sub-components (i) and (ii), the epoxide-containing copolymer may also be formed from a sub-component (iii), which is at least one ethylenically unsaturated (e.g. vinyl or vinylidene) monomer not carrying an epoxide ring. A mixture of the epoxide-containing copolymers may be used as component (c), as well.

The epoxide-containing copolymer is a thermoplastic which is formed by polymerization through the ethylenically unsaturated double bond of each sub-component (i) and each sub-component (ii). The epoxide rings are pendant from a sub-component (ii) and are free to react. Sub-components (i) and (ii) together form a generally linear polymer, and sub-component (iii) may be copolymerized with (i) and (ii) into that generally linear chain, or (iii) may be grafted as a homopolymeric branch onto the generally linear chain prepared from sub-components (i) and (ii).

Representative ethylenically unsaturated monomers carrying epoxide rings suitable for use as sub-component (ii) of the epoxide-containing copolymer include, for example, glycidyl esters of unsaturated carboxylic acids (e.g. glycidyl methacrylate); glycidyl ethers of unsaturated alcohols (e.g. allyl-glycidyl-ether) and of alkenylphenols (e.g. isopropenylphenyl-glycidylether); and vinyl and allyl esters of epoxycarboxylic acids (e.g. vinyl esters of epoxidized oleic acid). In general, all compounds which contain both a polymerizable unsaturated group and a reactive epoxide ring in the molecule can be used as sub-component (ii) for the manufacture of the epoxide-containing copolymer of this invention.

Various ethylenically unsaturated monomers carrying epoxide rings suitable for use as as sub-component (ii) may be described by structure as follows:

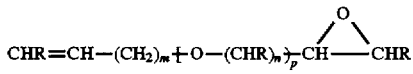

where m is an integer from 0 to 20, n is an integer from 1 to 10, p is 0 or 1, and each R is independently hydrogen or a $C_1$–$C_6$ alkyl radical (such as methyl, ethyl or n-propyl).

Representative ethylenically unsaturated monomers useful as sub-component (iii) in forming the epoxide-containing copolymer used in this invention include the following: vinyl or vinylidine compounds (especially when they bear a polar, electronegative group or functionality or are halogen-substituted) such as vinyl aromatic compounds such as styrene and substituted derivatives thereof, including alpha-methyl styrene, vinyl toluene, vinyl xylene, p-ethylstyrene, 2,4-dimethyl styrene, o-chlorostyrene, 2,5-dichlorostyrene, and halogenated styrene; mononitriles having alpha-beta-olefinic unsaturation and lower alkyl or halogen substituents such as acrylonitrile, methacrylonitrile or alpha-halogenated acrylonitrile; esters of ethylenically unsaturated carboxylic acids such as acrylic and methacrylic acid esters, including a $C_1$–$C_8$ alkyl acrylate such as ethyl acrylate, butyl acrylate, hexyl acrylate or hydroxy ethyl acrylate, a $C_1$–$C_8$ alkyl methacrylate such as methyl methacrylate or hexyl methacrylate, and other esters of the $C_1$–$C_6$ aliphatic or cycloaliphatic alcohols, especially the $C_1$–$C_4$ aliphatic or cycloaliphatic alcohols; vinyl propionate and vinyl benzoate; vinyl acetate; an acrylic or methacrylic acid; vinyl ethers such as vinyl-methyl-ether, vinyl-ethyl-ether and vinyl-isobutyl-ether; aliphatic vinyl compounds such as vinyl chloride, vinylidene chloride, vinyl amides; alpha-olefins; maleimides; the maleates; the fumarates, and the like, or mixtures of two or more of any of the foregoing. (Vinyl monomers such as the foregoing, when carrying an epoxide ring, may also be used as sub-component (ii).) Additionally, the epoxide-containing copolymer may contain (c)(iv) carbon monoxide as a comonomer.

The content of the sub-components used in preparing the epoxide-containing copolymer, by weight of the whole copolymer, may be as follows: sub-component (i) from about 30 percent to about 95 percent, preferably from about 40 percent to about 90 percent, and more preferably from about 45 percent to about 80 percent; sub-component (ii) from about 0.5 percent to about 40 percent, preferably from about 1 percent to about 30 percent, and more preferably from about 2 percent to about 20 percent; and sub-component (iii) up to about 40 percent, preferably from about 5 percent to about 30 percent, and more preferably from about 10 percent to about 20 percent.

The molecular weight of the epoxide-containing copolymer is typically between about 10,000 and about 500,000, preferably between about 20,000 and about 200,000, and more preferably between about 30,000 and about 80,000.

The melt index of the epoxide-containing copolymer is typically in the range of about 0.1 to about 100, and preferably between 0.5 and 30, grams/10 min. when measured at 190° C. according to ASTM D-1238 (Condition 190/2.16).

An epoxide-containing copolymer may be obtained according to known processes, for example by radical polymerization in chlorobenzene at 80° C. in 50 percent strength solution. For instance, monomers such as those listed above are dissolved in an appropriate solvent, such as benzene, chlorobenzene or toluene, and polymerized at a temperature of about 80° C. by adding azobisisobutyronitrile, whereby oxygen is excluded. After the monomers have been reacted, the solvent is distilled off (e.g. chlorobenzene at 100° C. and 20 torr), and the residue is dried in vacuum at 100° C. and then powdered. The epoxide-containing copolymer of this invention may also be prepared in gas phase under conditions suitable for polymerizing an olefin. For example, the polymer can be made in either a tubular reactor or a stirred autoclave, where heated, pressurized feed streams of olefin or vinyl monomer gas, peroxide free-radical initiator and chain transfer agent are injected into the reaction device. The reaction of formation typically occurs at 1,500–3,000 atm (152–304 MPa) and at a temperature usually not exceeding 300° C., as known in the art.

Component (d) in the compositions of this invention is a polyamine compound. A polyamine compound, as the term is employed herein, means a relatively high equivalent weight compound or polymer, or mixture of such compounds or polymers, which has a plurality of active hydrogen-containing groups (e.g. an —SH, —OH, —NH or —NH$_2$ group), of which at least about 30 percent are primary aromatic, Lewis acid-blocked primary aliphatic and/or secondary aliphatic, or aromatic amine groups. The polyamine compound, or mixture thereof, has an average of about 1.5 to about 6, and preferably about 1.8 to about 4, active hydrogen-containing groups per molecule. The polyamine compound preferably has an equivalent weight of about 400 to about 5,000, preferably about 500 to about 2,500, more preferably about 700 to about 2,000, and most preferably about 800 to about 1,700. Especially suitable polyamine compounds are polyethers or polyesters having a plurality of active hydrogen-containing groups of which at least about 30 percent are primary aromatic, Lewis acid-blocked primary aliphatic, and/or secondary aliphatic or aromatic amine groups.

Suitable secondary aliphatic polyamine compounds include polyols, especially polyether and polyester polyols, which have been modified such that secondary amine groups are from about 30 to about 100 percent, preferably about 50 to about 100 percent, more preferably about 60 to about 100 percent, of the active hydrogen-containing groups. Such secondary aliphatic polyamine compounds are conveniently prepared by reacting the corresponding polyol with a primary amine, and reducing the resulting intermediate with hydrogen, as described in U.S. Pat. No. 4,153,381, incorporated by reference. The secondary amine is advantageously an inertly substituted alkyl-, cycloalkyl- or benzyl-amine. Alternatively, secondary aliphatic polyamine compounds can be prepared in a Michael addition reaction of the corresponding primary aliphatic amine with an ethylenically unsaturated compound. Acrylonitrile is an especially suitable ethylenically unsaturated compound, although any compound which undergoes a Michael addition reaction with the primary amine can be used. The primary aliphatic amine itself can be prepared in the reductive amination of the corresponding polyol with ammonia, as taught, for example, in U.S. Pat. Nos. 3,128,311, 3,152,998, 3,654,370, 3,347,926, 4,014,933, incorporated by reference.

Suitable aromatic polyamine compounds include polyols, especially polyether and polyester polyols, which have been modified to contain aromatic amine groups as at least a portion of the active hydrogen-containing groups. Such compounds can be prepared, for example, by capping the corresponding polyether or polyester polyol with a diisocyanate to form a prepolymer, and then reacting the prepolymer with water to hydrolyze the free isocyanate groups to the corresponding primary amine. Alternatively, such compounds can be prepared by reacting the corresponding polyether or polyester polyol with p-nitro chlorobenzene, followed by the reduction of the nitro group to the amine, as taught in copending application of Steuber et al., Ser. No. 923,255, filed Oct. 27, 1986. In another suitable process, the corresponding hydroxyl- or primary amine-terminated polyether or polyester can be reacted in a transesterification reaction with a material such as a lower alkyl ester of p-aminobenzoic acid, particularly the methyl ester, to generate an aromatic polyamine compound.

Secondary aromatic polyamine compounds can be prepared in a Michael reaction of the corresponding primary aromatic amine compound and an ethylenically unsaturated compound such as acrylonitrile, as described above. Aromatic amine terminated compounds, either primary or secondary amine-terminated, advantageously contain a proportion of primary and/or secondary amine groups which is about 30 to about 100, preferably about 50 to about 100, more preferably about 70 to about 100 percent of the total number of active hydrogen-containing groups supplied by the relatively high equivalent weight polyamine compound used in the compositions of this invention.

Blocked primary aliphatic polyamine compounds suitable for use herein are advantageously prepared in the reductive amination of the corresponding hydroxyl-terminated compound with ammonia, followed by the complexation thereof with a Lewis acid such as benzoyl chloride, carbon dioxide, a metal carboxylate such as a tin, zinc, titanium or aluminum carboxylate, and the like. The Lewis acid is advantageously used in amounts of about 0.2 to about 5, and preferably about 0.9 to about 1.5, equivalents per equivalent of primary amine groups.

Various polyamine compounds suitable for use in the compositions of this invention may be described as

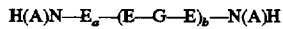

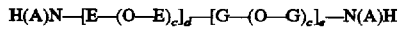

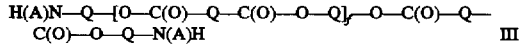

where

A is independently in each instance hydrogen or a $C_1$–$C_6$ linear or branched alkyl or alkylene radical, optionally interruptable with one or more nitrogen or oxygen atoms, wherein each carbon atom is optionally substituted with a hydroxy group, or a primary or secondary amine group;

E is independently in each instance a $C_1$–$C_{20}$, preferably a $C_1$–$C_{12}$, and more preferably a $C_1$–$C_8$ linear, branched or cyclic alkyl or alkylene radical, optionally interruptable with one or more nitrogen or oxygen atoms, wherein each carbon atom is optionally substituted with a halogen atom (such as a fluorine, chlorine, bromine or iodine atom), a $C_1$–$C_6$ alkoxy group, a $C_6$–$C_{10}$ aryloxy group, a phenyl group, a hydroxy group, or a primary or secondary amine group;

G is independently in each instance

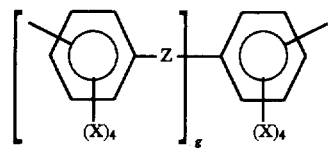

wherein:

(I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen (such as fluorine, chlorine and/or bromine) atoms, wherein each carbon atom is optionally substituted with a primary or secondary amine group; or (B) S, $S_2$, SO, $SO_2$, O or CO; or (C) a single bond, and (II) each X is independently hydrogen, a halogen atom (such as flourine, chlorine and/or bromine), a $C_1$–$C_{12}$ linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy; or a hydroxy or primary or secondary amine group; and (III) g is 0 or 1;

Q is independently in each instance E or G; a is 0 or 1;

b is 0 to 10, preferably 0–4, and more preferably 1 to 3, inclusive, although a and b cannot both be 0;

c is 1 to 70, preferably 5 to 50, and more preferably 5 to 30, inclusive;

d and e are both 0 or 1, although d and e cannot both be 0; and f is 0 to 70, preferably 5 to 50, and more preferably 5 to 30, inclusive; or

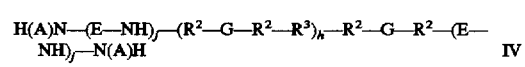

where $R^2$ is independently in each instance a —E—CH(OH)—E— radical;

$R^3$ is independently in each instance a —HN—(E—NH)$_j$— radical;

A, E and G are as set forth above;

h is 0 to 25, preferably 0 to 10, and more preferably 1 to 3, inclusive; and j is 1 to 6, and preferably 1 to 4, inclusive.

Numerical variables in the above formulae may take on individual values within the ranges specified or subranges other than those specifically set forth.

Other polyamine compounds useful herein include primary or secondary amine-terminated polyethers, polyesters or polyetheresters, or those compounds having a molecular weight of about 200 to about 8,000, preferably about 300 to about 6,000, more preferably about 300 to about 5,500, and most preferably about 400 to about 5,000.

Optional component (e) in the compositions of this invention is an elastomeric impact modifier, several different varieties of which, or a mixture thereof, are suitable for use herein.

One form which such elastomeric impact modifier may take is a thermoplastic elastomer, which is characterized, for example, in that it can be melted and recooled, or dissolved and reformed upon removal of the solvent, without undergoing any significant change in properties. Thermoplastic elastomers are also characterized by the randomness of the shape and size they take on when mixed by shearing forces with the other components making up the compositions of this invention, especially when heat is applied during such mixing. Because a thermoplastic elastomer is typically a long chain molecule, segments of a thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix.

One preferred thermoplastic elastomer is a block copolymer which can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is made by polymerizing one or more vinyl aromatic hydrocarbon monomers, and has an average molecular weight of about 4,000 to about 115,000. The B portion of the block copolymer results from polymerizing a diene and has a molecular weight of about 20,000 to about 450,000. In the A-B di-block copolymer, each block, A or B, can vary from 10–90% of the total weight of the copolymer. In the A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block is polymerized predominantly from vinyl aromatic hydrocarbons such as styrene, and substituted derivatives thereof wherein the aromatic moiety can be either mono- or polycyclic.

The B block is formed predominantly from substituted or unsubstituted $C_2$–$C_{10}$ dienes, particularly conjugated dienes such as butadiene or isoprene. The B block will be characterized by elastomeric properties which allow it to to absorb and dissipate an applied stress and then regain its shape. In the A-B-A tri-block copolymer, the second end block A can be formed in a manner similar to the first.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred block copolymers are vinyl aromatic/ conjugated diene block copolymers formed from styrene and butadiene or styrene and isoprene. When the styrene/ butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. The vinyl aromatic/diene block copolymers described above are discussed in greater detail in Holden, U.S. Pat. No. 3,265,766; Haefele, U.S. Pat. No. 3,333,024; Wald, U.S. Pat. No. 3,595,942; and Witsiepe, U.S. Pat. No. 3,651,014, each of which is incorporated herein.

Linear, branched, radial or teleblock A-B-A or A-B block copolymer thermoplastic elastomers can also be prepared from materials other then vinyl aromatic systems. These other copolymers also have a rigid block "A" having a $T_g$ above room temperature (approximately 23°–25° C.) and a rubbery block "B" having a $T_g$ below room temperature. Examples of typical pairings of the various materials used to form the respective A and B blocks of such other block copolymer thermoplastic elastomers are shown below in Table I.

TABLE I

| Block Copolymer Pairings | |
|---|---|
| A block | B block |
| polyethylene | ethylene/butylene copolymer |
| polyurethane | polyester polyether polycarprolactam |
| polyester | polyether |
| polypropylene | EPDM rubber |

Other thermoplastic elastomers useful as an impact modifier in the compositions of this invention include olefinic elastomers, which are based generally on a long-chain, hydrocarbon backbone, which may or may not be grafted with one or more vinyl monomers. Representative examples of a few olefinic elastomers which illustrate the variation in the known substances which would suffice for such purpose are as follows: butyl rubber; chlorinated polyethylene rubber; chlorosulfonated polyethylene rubber; ethylene/ propylene copolymer and ethylene/propylene/diene copolymer, which may be grafted with one or more vinyl monomers; neoprene rubber; nitrile rubber; polybutadiene and polyisoprene.

Other elastomeric impact modifiers useful in the compositions of this invention are emulsion-type, core-shell graft copolymer elastomers containing greater than forty percent rubber by weight. The random shape and size assumed in the polymer composition matrix by a thermoplastic elastomer, as described above, is to be distinguished from the shape and size assumed by a core-shell graft copolymer. A core-shell graft copolymer is typically present in the polymer matrix in a bead shape both before and after mixing by application of shearing forces, whether heat is used or not, and is usually present in a rather narrow size range, for example 0.05–0.8 microns. The retention of this core-shell, or spherical, shape by the graft polymer, even after heating and mixing, results from the fact that the outer layers, which surround the core, are formed by grafting appropriate monomers onto the core. A core-shell graft copolymer typically cannot be melted and recooled without a significant change in properties because the graft polymer will tend to decompose or crosslink, and the bead-shaped segments of graft polymer will tend to agglomerate upon melting, making dispersion of them by mixing difficult.

Representative examples of the core-shell graft copolymer elastomers suitable for use herein are those which can be based on either a diene rubber, an acrylate rubber or on mixtures thereof.

A diene rubber contains a substrate latex, or core, which is made by polymerizing a diene, preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound, if any. The elastomeric core phase should have a glass transition temperature ("$T_g$") of less than about 10° C., and preferably less than about −20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$–$C_8$ alkyl acrylate such as ethyl acrylate or hexyl acrylate; a $C_1$–$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$, most preferably butyl acrylate. The elastomeric core phase should have a $T_g$ of less than about 10° C., and preferably less than about −20° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$–$C_8$ alkyl acrylate like methyl acrylate, hydroxy ethyl acrylate or hexyl acrylate, or a $C_1$–$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

In a preferred embodiment, the compositions of this invention, and those formed by the methods of this invention, are characterized in that (a) the glass transition temperature, or the highest glass transition temperature, thereof (i) is at least 95 percent, and preferably at least 98 percent, of the glass transition temperature of the polycarbonate contained therein, or (ii) advantageously exceeds 148° C., preferably exceeds 162° C., more preferably exceeds 176° C., and most preferably exceeds 185° C.; and (b) the heat deflection temperature under load thereof, determined according to ASTM 648-82 at 264 psi (1.82 MPa), (i) is at least 95 percent, and preferably at least 98 percent, of the heat deflection temperature under load of the polycarbonate contained therein, or (ii) advantageously exceeds 280° F. (137.8° C.), preferably exceeds 290° F. (143.3° C.), and more preferably exceeds 295° F. (146.1° C.)

By the methods of this invention, the impact and solvent resistance of polycarbonate compositions may be improved by blending polycarbonate with polyester, an olefinic epoxide-containing copolymer and a polyamine compound, and, optionally, an elastomeric impact modifier.

A variety of additives may be used in the compositions of this invention for protection against thermal, oxidative and ultra-violet degradation. Representative of the thermal and oxidative stabilizers which can be advantageously utilized are hindered phenols, hydroquinones, phosphites, including substituted members of those groups and/or mixtures of more than one thereof. A preferred phenolic anti-oxidant is Irganox™ 1076 anti-oxidant, available from Ciba-Geigy Corp. Ultra-violet stabilizers such as various substituted resorcinols, salicylates, benzotriazoles, benzophines, and hindered phenols can also be usefully included in the compositions hereof, as can be lubricants, colorants, fillers such as talc, clay, phosphate, metal, inorganic or graphite fibers, or mica, dyes, pigments, mold release agents, and reinforcement agents such as fiberglass or phosphate, metal, inorganic or graphite fibers. Additives and stabilizers of the same or a similar kind as the foregoing are known, and the use and selection thereof is within the skill in the art. However, such additives, if used, typically do not exceed 15 percent by weight of the total composition, except fillers or reinforcing agents, which may constitute up to 40 weight percent of the composition.

To illustrate the practice of this invention, examples of preferred embodiments are set forth below, however, these examples (Examples 1–16) do not in any manner restrict the scope of this invention. Some of the particularly desirable features of this invention may be seen by contrasting the characteristics of these examples with those of various controlled formulations (Controls A–H) which do not possess the features of, and are not therefore embodiments of, this invention.

The polycarbonate compositions prepared in Controls A–H and Examples 1–16 are made by dry blending the ingredients thereof and agitating same in a paint shaker for 7 minutes. The dry blended formulations are then melt mixed in a vented 30 mm Werner-Pfleiderer co-rotating, twin screw extruder at 250 rpm using a 270° C. set temperature. Each extruded composition is passed through a water bath, chopped into granules and collected for molding. Granules are thoroughly dried in a circulated air oven at 115° C. for six hours prior to molding. All samples are prepared by injection molding on a 75 ton Arburg molding machine. Molding temperatures for the barrel and mold are set at 280° C. and 170°–190° F., respectively.

The formulations of the compositions of Controls A–C and Examples 1–3 are given below in Table II, in parts by weight based on the total composition. In Table II:

"Polycarbonate" is a polycarbonate prepared from 1,1-bis(4-hydroxyphenyl)-1-phenyl ethane having a weight average molecular weight of 30,000, available from The Dow Chemical Company;

"Polyester" is Tratuf™ 9506 poly(ethylene terephthalate) having an 0.95 intrinsic viscosity, available from Goodyear Tire and Rubber Company;

"E/VA/GMA" is a terpolymer prepared from ethylene, vinyl acetate and glycidyl methacrylate, available from Sumitomo Chemical America as Bondfast™ 2B copolymer, having a weight-average molecular weight of approximately 100,000;

"PPO" is polypropylene oxide which has a number average molecular weight of 2,000;

"PPO-S" is polypropylene oxide which has a number average molecular weight of 2,000 and a secondary amine group at each terminus;

"PPO-P" is polypropylene oxide which has a number average molecular weight of 2,000 and a primary amine group at each terminus; and "EH 52" is an amine-terminated epoxy described by the formula $R^4—(R^5—R^6—R^5—R^7)_q—R^5—R^6—R^5—R^4$, wherein $R^4$ is a $H_2N—C_2H_4—NH—C_2H_4—NH—$ radical, $R^5$ is a $—CH_2—CH(OH)—CH_2—$ radical, $R^6$ is a Bisphenol-A radical, $R^7$ is a $—HN—C_2H_4—NH—C_2H_4—NH—$ radical, and q is 0 to 10, and preferably 1 to 3.

Molded samples of the compositions of Controls A–C and Examples 1–3 are evaluated according to the following tests, the results of which are also reported in Table II:

Impact resistance is measured by the Izod test according to ASTM Designation D 256-84 (Method A) at 73° F. The notch is 10 mils (0.254 mm) in radius. Izod results are reported in ft-lb/in.

The Gardner dart drop impact test ("Gardner") is performed at room temperature by dropping a 16 pound (7.26 km) weight which carries a ½" (12.7 mm) dart onto a circular test sample which is 2½" (63.5 mm) in diameter and ⅛" (3.175 mm) thick. The weighted dart falls freely on a slotted track and impacts the sample, which is secured in position in the path of descent on an aluminum cast base with a 0.640 inch (16.26 mm) hole to accept the dart after it impacts the sample. The instrument is a Pacific Scientific model no. IG-1120. The sample fails if it shows a crack or perforation on the side on which impact did not occur. The results are either pass (no break or perforation by the dart at the point of impact) or fail (material exhibits crack or perforation) when the dart has developed a particular amount of energy by falling from the necessary height on the track, as indicated thereon, to develop such energy. The value recorded in Table II is the greatest amount of energy a sample could accept without failing, expressed in in-lb.

Percent elongation at break ("Elongation") is measured in accordance with ASTM Designation D 638-84 at a rate of 2"/minute with respect to a sample which has been annealed at 130° C. for thirty minutes and then placed under 0.5 percent strain while submerged in a bath of 60 wt isooctane and 40 wt toluene for 5 minutes. After removal from the bath the sample is allowed to dry without strain for at least 24 hours before testing.

Percent of length retention ("Rentention") is calculated by dividing the percent elongation value obtained as to a sample which has received the solvent bath, as described above, by the percent elongation value obtained as to sample of the same formulation which has not received the solvent bath.

The molding temperature of each sample is determined by observing the lowest barrel temperature, when processing a sample in the same extruder [a 55-ton (49.5 Mg) Negri Bossi] under constant conditions [such as injection pressure (50 bar, 5 MPa), and screw speed], at which the sample will completely fill a mold which is maintained at 175° F. (79.4° C.) so as to produce a properly formed part.

Deflection temperature under load ("D.T.U.L.") is measured in accordance with ASTM Designation D 648-82 at 66 psi.

TABLE II

|  | Controls | | | Examples | | |
| --- | --- | --- | --- | --- | --- | --- |
|  | A | B | C | 1 | 2 | 3 |
| Polycarbonate | 100 | 70 | 60 | 60 | 60 | 60 |
| Polyester | — | 30 | 30 | 30 | 30 | 30 |
| E/VA/GMA | — | 10 | 10 | 10 | 10 | 10 |
| PPO | — | — | 0.3 | — | — | — |
| PPO-S | — | — | — | 0.3 | — | — |
| PPO-P | — | — | — | — | 0.3 | — |
| EH 52 | — | — | — | — | — | 0.2 |
| Izod, ft-lb/in | 1.8 | 2.4 | 2.4 | 10.2 | 9.7 | 8.7 |
| Gardner, in-lb | 500 | 384 | 384 | 588 | 480 | 464 |
| Elongation, % | 106 | 64 | 69 | 81 | 73 | 71 |
| Retention, % | <5 | >90 | >90 | >90 | >90 | >90 |
| Molding Temp., °C. | 320 | 285 | 285 | 285 | 285 | 285 |
| D.T.U.L., °F. | 350 | 331 | 334 | 332 | 329 | 336 |

The results of the tests on Controls A–C and Examples 1–3 show that the presence of a polyamine compound in a polycarbonate composition imparts a desirable balance of impact and solvent resistance while maintaining an acceptable level of resistance to thermal deformation. The significant increase in the Izod impact value of Examples 1–3 over those of Controls A–C may be noted, as may the fact that Examples 1–3 have, on average, a desirably high Gardner value and D.T.U.L.

The formulations of the compositions of Control D and Examples 4–12 are shown below in Table III in parts by weight based on the total composition. In Table III, "Polycarbonate" and "Polyester" each refer to the same component identified above with respect to Examples 1–3. "E/GMA" refers to a copolymer containing ethylene and glycidyl methacrylate available from Sumitomo Chemical America as Bondfast™ E copolymer (10 weight percent). "PPO", "PPO-S", "PPO-P" and "EH 52" also each refer to the same component identified above with respect to Examples 1–3. The results of the Izod impact test on samples of Control D and Examples 4–12 are also shown below in Table III.

TABLE III

|              | D   | 4   | 5   | 6   | 7   | 8    | 9   | 10  | 11  | 12  |
|--------------|-----|-----|-----|-----|-----|------|-----|-----|-----|-----|
| Polycarbonate | 60  | 60  | 60  | 60  | 60  | 60   | 60  | 60  | 60  | 60  |
| Polyester    | 30  | 30  | 30  | 30  | 30  | 30   | 30  | 30  | 30  | 30  |
| E/GMA        | 10  | 10  | 10  | 10  | 10  | 10   | 10  | 10  | 10  | 10  |
| PPO          | 0.6 | 0.5 | 0.5 | 0.4 | 0.4 | 0.3  | 0.2 | 0.2 | —   | —   |
| PPO-S        | —   | 0.1 | —   | 0.2 | —   | 0.3  | —   | 0.4 | —   | 0.6 |
| PPO-P        | —   | —   | 0.1 | —   | 0.2 | —    | 0.4 | —   | 0.6 | —   |
| Izod, ft-lb/in | 2.3 | 4.8 | 5.6 | 8.8 | 7.5 | 10.4 | 9.6 | 8.2 | 7.6 | 6.8 |

The results of these tests on Control D and Examples 4–12 show the improvement in Izod impact value obtainable from the addition of a polyamine compound to a polycarbonate composition.

The formulations of the compositions of Controls E–H and Examples 13–16 are shown below in Table IV, stated in parts by weight based on the total composition. "Polycarbonate", "Polyester" and "PPO-S" are the same as used in Examples 1–3. "E/GMA" is the same as used in Examples 4–12. The Izod impact test is performed on Controls E–H and Examples 13–16, and the results thereof are also shown below in Table IV.

TABLE IV

|              | Controls |     |     |     | Examples |      |      |      |
|--------------|-----|-----|-----|-----|-----|------|------|------|
|              | E   | F   | G   | H   | 13  | 14   | 15   | 16   |
| Polycarbonate | 80  | 60  | 40  | 20  | 80  | 60   | 40   | 20   |
| Polyester    | 10  | 30  | 50  | 70  | 10  | 30   | 50   | 70   |
| E/GMA        | 10  | 10  | 10  | 10  | 10  | 10   | 10   | 10   |
| PPO-S        | —   | —   | —   | —   | 0.3 | 0.3  | 0.3  | 0.3  |
| Izod, ft-lb/in | 3.9 | 2.4 | 2.0 | 1.8 | 6.2 | 10.2 | 14.1 | 15.7 |

The results of the tests on Controls E–H and Examples 13–16 also show the improvement in Izod impact value obtainable from the addition of a polyamine compound to a polycarbonate composition.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A thermoplastic composition of matter comprising, in admixture,
   (a) polycarbonate,
   (b) polyester,
   (c) an olefinic epoxide-containing copolymer, having a glass transition temperature of less than 0° C., prepared from (i) one or more olefin monomers, one or more conjugated dienes, or a mixture thereof, and (ii) at least one vinyl monomer carrying at least one epoxide ring, and
   (d) a polyamine compound.

2. The composition of claim 1 wherein component (ii), the olefinic epoxide-containing copolymer is a glycidyl ester of an unsaturated carboxylic acid.

3. The composition of claim 1 wherein the polyamine compound is described as H(A)N—$E_a$—(E—G—E)$_b$—N(A)H
wherein
A is independently in each instance hydrogen or a $C_1$–$C_6$ linear or branched alkyl or alkylene radical, optionally interruptable with one or more nitrogen or oxygen atoms, wherein each carbon atom is optionally substituted with a hydroxy group, or a primary or secondary amine group;

E is independently in each instance a $C_1$–$C_{20}$ linear, branched or cyclic alkyl or alkylene radical, optionally interruptable with one or more nitrogen or oxygen atoms, wherein each carbon atom is optionally substituted with a halogen atom, a $C_1$–$C_6$ alkoxy group, a $C_6$–$C_{10}$ aryloxy group, a phenyl group, a hydroxy group, or a primary or secondary amine group;

G is independently in each instance

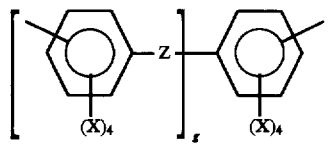

wherein:
(I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen atoms, wherein each carbon atom is optionally substituted with a primary or secondary amine group; or (B) S, $S_2$, SO, $SO_2$, O or CO; or (C) a single bond;
(II) each X is independently hydrogen, a halogen atom, a $C_1$–$C_{12}$ linear or cyclic alkyl, alkoxy, aryl or aryloxy radical, or a hydroxy or primary or secondary amine group; and
(III) g is 0 or 1; and
a is 0 or 1; and
b is 0 to 10, inclusive, although a and b cannot both be 0.

4. The composition of claim 1 wherein the polyamine compound is described as

H(A)N—[E—(O—E)$_c$]$_d$—O$_d$—[G—(O—G)$_c$]$_e$—N(A)H
wherein A, E and G are as set forth in claim 6, c is 1 to 70, inclusive, and d and e are both 0 or 1, although d and e cannot both be 0.

5. The composition of claim 1 wherein the polyamine compound is described as H(A)N—Q—[O—C(O)—Q—C(O)—O—Q]$_f$—O—C(O)—Q—C(O)—O—Q—N(A)H
wherein Q is independently in each instance E or G, as set forth in claim 6, and f is 0 to 70, inclusive.

6. The composition of claim 1 wherein the polyamine compound is described as H(A)N—(E—NH)$_j$—(R$^2$—G—R$^2$R$^3$)$_h$—R$^2$—G—R$^2$—(E—NH)$_j$—N(A)H wherein R$^2$ is independently in each instance a —E—CH(OH)—E— radical; R$^3$ is independently in each instance a —NH—(E—

NH)$_j$— radical; A, E and G are as set forth in claim 3; h is 0 to 25, inclusive; and j is 1 to 6, inclusive.

7. The composition of claim 1 which has a glass transition temperature exceeding 148° C.

8. The composition of claim 1 wherein the polycarbonate is prepared from Tetrahalo Bisphenol-A, Tetraalkyl Bisphenol-A, Bisphenol-AP, Bis(hydroxyphenyl) fluorene, or a copolymer of one or more of the foregoing with Bisphenol-A.

9. The composition of claim 1 further comprising an elastomeric impact modifier.

10. The composition of claim 1 wherein
   (a) the polycarbonate is prepared from Tetrahalo Bisphenol-A, Tetraalkyl Bisphenol-A, Bisphenol-AP, Bis(hydroxyphenyl) fluorene, or a copolymer of one or more of the foregoing with Bisphenol-A,
   (b) the polyester is a poly(alkylene terephthalate),
   (c) the epoxide-containing copolymer is ethylene/glycidyl methacrylate copolymer, ethylene/vinyl acetate/ glycidyl methacrylate terpolymer, ethylene/butyl acrylate/glycidyl methacrylate terpolymer, or a mixture thereof, and
   (d) the polyamine compound is as described in claim 7.

11. The composition of claim 1 in the form of a molded article.

12. A motor vehicle comprising a part molded from the composition of claim 1.

13. A thermoplastic composition of matter comprising, in admixture,
   (a) polycarbonate in an amount of from about 5 to about 92 weight parts
   (b) polyester
   (c) olefinic epoxide-containing copolymer, having a glass transition temperature of less than 0° C., prepared from (i) one or more olefin monomers, one or more conjugated dienes, or a mixture thereof, and (ii) at least one vinyl monomer carrying at least one epoxide ring, and
   (d) polyamine compound in an amount of from about 0.0005 to about 1.0 weight parts,
said weight parts being based on the total composition.

14. The composition of claim 13 further comprising
   (e) an elastomeric impact modifier in an amount of up to 50 weight parts, said weight parts being based on the total composition.

* * * * *